United States Patent [19]

Jacobson

[11] Patent Number: 5,211,821
[45] Date of Patent: May 18, 1993

[54] METHOD AND APPARATUS FOR PROVIDING ECOLOGICAL PROTECTION WITH RESPECT TO EQUIPMENT USING A HALOGENATED HYDROCARBON

[75] Inventor: Esther Jacobson, Tel Aviv, Israel
[73] Assignee: Spectronix Ltd., Tel-Aviv, Israel
[21] Appl. No.: 693,475
[22] Filed: Apr. 30, 1991

[30] Foreign Application Priority Data

May 4, 1990 [IL]  Israel ......................................... 94285

[51] Int. Cl.$^5$ .............................................. C01B 7/00
[52] U.S. Cl. ............................ 204/157.41; 204/157.48
[58] Field of Search ..................... 204/157.41, 157.48, 204/158.21; 422/89, 168, 115, 108

[56] References Cited

U.S. PATENT DOCUMENTS

| | | | |
|---|---|---|---|
| 254,103 | 2/1882 | Bayha | 422/168 |
| 3,966,877 | 6/1976 | Kalach et al. | 423/240 R |
| 4,069,018 | 1/1978 | Karna et al. | 422/108 |
| 4,832,806 | 5/1989 | Helfritch | 204/157.44 |

FOREIGN PATENT DOCUMENTS 0360941  4/1990  European Pat. Off. .
3625232  2/1988  Fed. Rep. of Germany .

OTHER PUBLICATIONS

Hideo Okabe, Photochemistry of Small Molecules, 1978 pp. 117, 300-301.

Primary Examiner—W. Gary Jones
Assistant Examiner—Dean Nguyen
Attorney, Agent, or Firm—Benjamin J. Barish

[57] ABSTRACT

A method and apparatus for providing ecological protection with respect to equipment using halogenated hydrocarbons in which the release, escape or discharge of a halogenated hydrocarbon from such equipment is detected, and a source of radiation for effecting selective dissociation of the halogenated hydrocarbon is energized to separate the halogen atoms therefrom and to convert them to a halide salt.

20 Claims, 2 Drawing Sheets

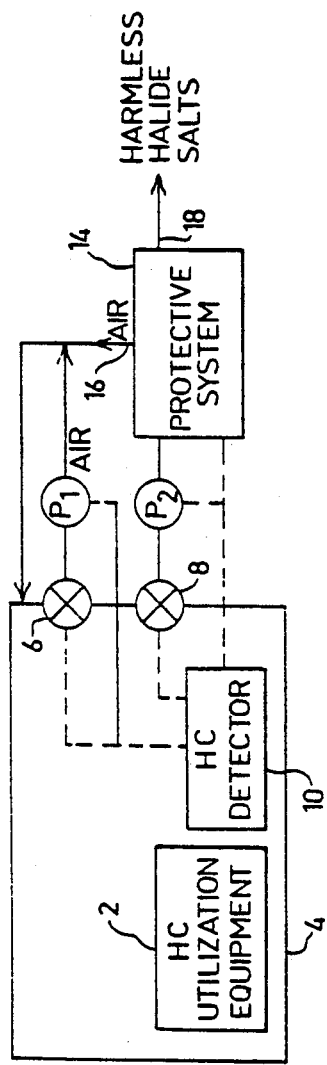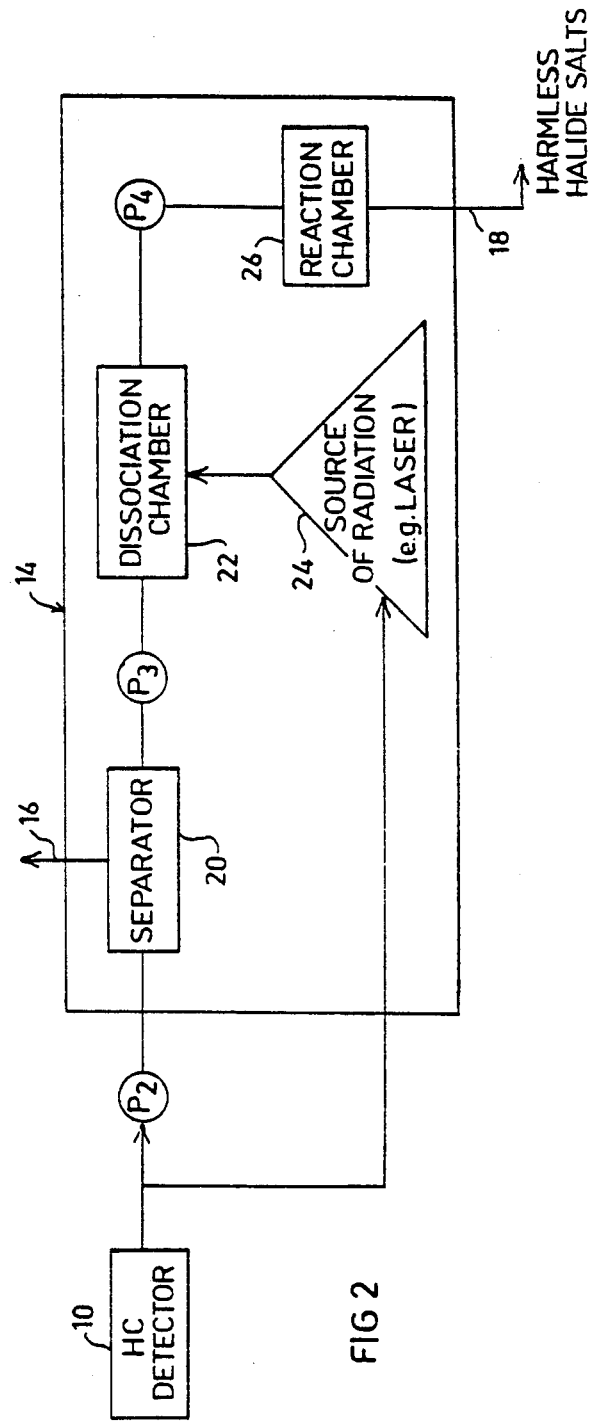

METHOD AND APPARATUS FOR PROVIDING ECOLOGICAL PROTECTION WITH RESPECT TO EQUIPMENT USING A HALOGENATED HYDROCARBON

FIELD AND BACKGROUND OF THE INVENTION

The present invention relates to a method, and also apparatus, for providing ecological protection with respect to equipment using a halogenated hydrocarbon.

Halogenated hydrocarbons, or halocarbons, are chemical compounds of organic origin based on hydrocarbon chains in which hydrogen atoms are substituted with halogen atoms such as fluorine, chlorine, bromine and iodine. These chemical substances (liquids and gases) have been found in the last 40 years to have a vast range of industrial applications in areas such as: air-conditioning and refrigeration, cleaning and degreasing processess, organic extracting solvents, fire-retardant additives, fire extinguishing agents, aerosol propellants, foam blowing agents, and various intermediate and precursors in organic syntheses.

Since the worrying discovery of the "hole" in the ozone layer in the atmosphere over the Antarctic Pole in 1986, the world-wide community of environmental scientists has accumulated much data on the ozone depleting substances found in that region. It was found that various materials reach the stratosphere, react with the ozone, and dissociate it to oxygen molecules and atoms. These materials have been classified according to their ability to destroy the ozone in the atmosphere. A mathematical parameter, called the "Ozone Depletion Potential (ODP)", was devised to measure and compare the ozone destruction capability of materials: the higher the ODP, the more potentially dangerous the substance.

Among the materials with high ODP are the halocarbons, especially the CFC (chlorofluorocarbons) and the Halons, because of their high content of active halogen atoms that act on the ozone molecule and cause its dissociation. Theses materials, being stable for many years (their life-time is well over 20 years), pose a continuous threat to the ozone layer since their release into the atmosphere is inevitable. Even closed circuit systems (such as air conditioning and refrigeration systems), and certainly open systems, release these materials into the atmosphere when tested, calibrated, repaired, maintained, or malfunctioning.

However these halocarbon materials are of utmost importance in military and civilian applications and for industrial and domestic purposes. So far no comparable alternative substance has been found, nor seems likely to be developed in the near future, because of the unique chemical and physical characteristics of these substances.

In order to continue the necessary use of halocarbons in its various applications, one must find a method to destroy these materials once they are likely to be released into the atmosphere, whether the release is on purpose or accidental. Various methods (chemical and physical)could be applied for the halocarbon's destruction, such as heat decomposition (incineration), adsorbance, absorbance, chemical decomposition with catalysts, metal scrubbing, pyrolysis, wet air oxidation and supercritical water oxidation. The only demonstrated technology which is currently being used is incineration. However, these methods do not specifically destroy the active site of the material, i.e. the halogen atom, and therefore allow many potential hazardous by-products to be released into the atmosphere. These by-products may still contain damaging amounts of halogenated hydrocarbons with high ODP and long life-time.

OBJECTS AND BRIEF SUMMARY OF THE INVENTION

An object of the present invention is to provide a method and apparatus for reducing the ecological damage caused by the release of halogenated hydrocarbons to the atmosphere.

According to one aspect, the present invention involves a method of providing ecological protection with respect to equipment using halogenated hydrocarbons, comprising: enclosing the equipment within an enclosure having a first outlet for normally discharging air from the enclosure to the atmosphere; detecting the presence of a halogenated hydrocarbon within the enclosure, and upon detecting its presence above a predetermined concentration, discharging the air from the enclosure through a second outlet; applying radiation to the halogenated hydrocarbon in the air discharged from the enclosure through the second outlet for effecting selective dissociation of the halogenated hydrocarbon to separate the halogen atoms therefrom; and immediately neutralizing the separated halogen atoms by converting them to a halide salt.

According to further features in the preferred embodiments of the invention described below, the air within the enclosure is pumped to a separator where the halogenated hydrocarbon is separated from the air. The separated halogenated hydrocarbon is irradiated by a source of radiation, such as a laser or an ultraviolet lamp. Preferably, the pumping of the air from the enclosure to the separator, as well as the energization of the source of radiation, is effected automatically in response to the detection of the halogenated hydrocarbon above a predetermined threshold concentration within the enclosure. The system, however, can also be activated manually when the excessive concentration of the halogenated hydrocarbon is detected and indicated, e.g., by a display or alarm.

According to further features in the described preferred embodiment, the separation may be effected by a cyclone centrifuge, or by a molecular sieve, or by a gas chromatograph.

According to still further features in the described preferred embodiments, the halogen atoms separated from the hydrocarbon are converted to a halide salt in a reaction chamber. The reaction chamber may include an alkali reactant, ammonia, a charcoal absorbant, a metal catalyst bed, or other means for converting the halogen atoms to a halide salt and for removing such salt.

The invention also provides apparatus for providing ecological protection in accordance with the above method.

The invention thus introduces a new concept of selective dissociation of the halocarbons (the cleavage of the halogen atom from the halocarbon molecule) by applying concentrated energy (laser or other irradiating means) to the halocarbon. The products of such a reaction can be controlled by the amount of energy applied to the material, or such products can be absorbed or reacted according to preselected processes. This concept can be embodied in apparatus designed for portable use or for fixed location use, working manually or automatically, and in areas where halocarbons are likely to be employed and/or released.

For example, the invention can be embodied in autonomous units to be added to air conditioning systems, fire extinguishing systems, or other systems utilizing halocarbons, so as to be effective whenever an excessive concentration of the halocarbon is detected. The invention may be in the form of an add-on unit to an air conditioning system which unit normally permits the conditioned air to be circulated through the system, but which is effective, upon the detection of the excessive concentration of the halocarbon in the circulated air, to divert the circulated air to a separator for separating and neutralizing the halocarbon before the air is recirculated back to the air conditioning system. The invention could also be included in an enclosure for the air conditioning system or fire extinguishing system so as to continuously monitor the halocarbon concentration within the enclosure and to block the flow from the enclosure to the atmosphere whenever the concentration is found to be excessive.

BRIEF DESCRIPTION OF THE DRAWINGS

The invention is herein described, by way of example only, with reference to the accompanying drawings, wherein:

FIG. 1 schematically illustrates one form of apparatus constructed in accordance with the present invention;

FIG. 2 is a flow diagram more particularly illustrating the construction and operation of the apparatus of FIG. 1;

THE OZONE LAYER PROBLEM

Figure 3:
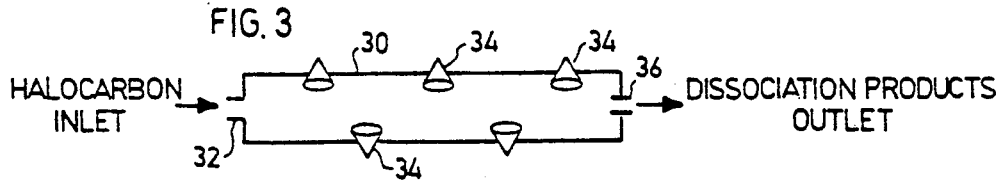
FIGS. 3 and 4 schematically illustrate two types of dissociation chambers which may be used in the apparatus illustrated in FIG. 2.

Chlorofluorocarbons (CFC) belong to the family of chemical compounds known as halogenated hydrocarbons, or halocarbons. They are hydrocarbons in which some or all of the hydrogen atoms have been replaced by atoms of halogens (fluorine, chlorine, bromine and iodine). Of particular interest are halocarbons made up of chlorine and fluorine. Fully halogenated CFC's are those in which all hydrogen atoms have been replaced, e.g., CFC-12 ($CF_2Cl_2$). Partially halogenated CFC's are those that have hydrogen atoms as well as halogens, such as HCFC-22 ($CHF_2Cl$). Halons (employed especially as fire extinguishing agents) are compounds that comprise fluorine, chlorine and bromine, such as Halon 1211 ($CF_2ClBr$) and Halon 1301 ($CF_2Br$).

The usefulness of these chemicals lies in their relative inertness and their volatility. Consequently, they are used not only as refrigerants and fire extinguishing agents, but also in a large number of other applications, such as aerosol propellants, foam blowing agents, solvents, etc. CFC's and Halons are released at the earth's surface and are then transported to the upper atmosphere (stratosphere), where they can remain for long periods of time because of their inertnesss. However, in this region, the halocarbons react with ozone in a series of chemical reactions, causing the ozone's decomposition.

Ozone ($O_3$) is a trace gas in the earth's atmoshpere. It predominates in the stratosphere where it shields the earth's surface from damaging U.V. (ultraviolet) radiation from the sun. Ozone itself undergoes photodissociation when exposed to U.V. radiation in some of the following processes:

$$O_3 + U.V.\ radiation \rightarrow O_2 + O\cdot$$

$$O_3 + O \rightarrow O_2 + O_2$$

$$O + O + E\ (excess\ energy) \rightarrow O_2 + E$$

The amount of ozone in the stratosphere determined by the balance between the physical and the chemical processes responsible for both its production and destruction. Compounds like CFC's are likely to undergo photodissociation in the stratosphere, hence generating halogen atoms that then react with the ozone to cause its destruction in reactions like:

$$CFCl_3 + U.V.\ radiation \rightarrow CFCl_2 + Cl\cdot$$

$$Cl + O_3 \rightarrow ClO + O_2$$

$$ClO + O \rightarrow Cl + O_2$$

wherein the produced Cl can attack new ozone (Oz).

The process is similar for Halon, but here bromine is also produced, which is far more destructive of the ozone. The following table demonstrates the damage that can occur to the ozone layer if these materials are released directly to the atmosphere.

| COMPOUND | Atmospheric Lifetime (years) | Ozone Depletion Potential (ODP) |
| --- | --- | --- |
| CFC 11 | 75 | 1.0 |
| CFC 12 | 111 | 1.0 |
| CFC 113 | 90 | 0.8 |
| CFC 114 | 185 | 1.0 |
| CFC 115 | 380 | 0.6 |
| HCFC 22 | 20 | 0.05 |
| Halon 1211 | 25 | 3.0 |
| Halon 1301 | 110 | 10.0 |
| Halon 2402 | not reported | 6.0 |

The manufacturers, as well as the users, of the halocarbons are fully aware of the serious damage that could be caused by the release of these materials to the atmosphere. They are taking all reasonable steps to reduce unnecessary emission while also seeking environmentally safe alternatives. Since acceptable alternative materials are not yet available, the purpose of the present invention is to provide a method and an apparatus for selective destruction of the halogen component of the halocarbon and its chemical neutralization before reaching the atmosphere.

DESCRIPTION OF PREFERRED EMBODIMENTS

The drawings schematically illustrate one form of apparatus that may be used in accordance with the present invention.

Thus, as shown in FIG. 1, the equipment using a halogenated hydrocarbon, which may be any of the types referred to above, is generally designated 2 and is enclosed within an enclosure 4 having two outlets 6, 8. Also located within enclosure 4 is a detector 10 which is capable of detecting small amounts of a halocarbon released by the equipment 2.

The air within enclosure 4 may be pumped from the enclosure to the atmosphere via outlet 6 or outlet 8, as controlled by detector 10. Thus, under normal conditions, outlet 6 is open, and pump $P_1$ is actuated so as to exhaust the air to the atmosphere via that outlet. However, when detector 10 detects a halocarbon within enclosure 4 in a concentration above a predetermined threshold, it automatically closes outlet 6, deenergizes pump $P_1$, opens outlet 8, and energizes pump $P_2$, to pump the air containing the halocarbon into a protective system, generally designated 14 in FIG. 1 and more particularly illustrated in FIG. 2. As will be described below with respect to FIG. 2, the protective system 14 separates the halocarbon from the air, discharges the air via an outlet 16, e.g., back to the enclosure, and converts the separated halocarbon to a harmless halide salt which may be discharged via outlet 18 or absorbed by a body within the protective equipment 14 and periodically removed.

As shown more particularly in FIG. 2, protective equipment 14 includes a separator 20. Separator 20 may be a cyclone centrifuge for separating the heavy halocarbons from the air. Alternatively, it may be a molecular sieve separator, or a gas chromatograph separator. In any case, the air, after removal of the halocarbons, is discharged by separator 20 to the atmosphere of the enclosure 4 via the air outlet 16, whereas the separted halocarbon is pumped by pump $P_3$ to a dissociation chamber 22.

A source of radiation, generally designated as 24, is automatically energized by detector 10 to irradiate the separated halocarbon in dissociation chamber 22 with high energy radiation, such as from a laser or ultraviolet source. The radiation is applied continuously, or in the form of pulses, and with sufficient intensity to cause selective dissociation of the halocarbons, i.e. complete cleavage of the halogen atom from the molecule.

The products of the dissociation chamber 22 are pumped by pump $P_4$ to a reaction chamber 26, where the halogen products of the selective dissociation are scrubbed, absorbed, and/or treated with alkali materials, ammonia, charcoal or with a metal catalyst, to produce harmless salts, such NaCl, KBr, $NH_4Cl$, and the like. The reaction chamber 26 could be, or include, a disposable unit, like a scrubber, which may be periodically replaced; alternatively, reaction chamber 26 may be continuously operated and cleaned periodically.

The apparatus may have an independent energy source (e.g., a battery) which may be activated manually by the human operator when an excessive halocarbon release is detected, or automatically by a triggering signal from the halocarbon detector 10. The HC utilization equipment 2 may be connected directly to the outlet 8, or to the pump $P_2$, thus enabling direct discharge of the halocarbon into the dissociation apparatus. Such a construction can be employed in an open space, i.e., where the HC utilization equipment 2 cannot be enclosed. The radiation source 24 may be a single large unit, or a plurality of smaller units.

FIG. 3 illustrates one form of dissociation device which may be used for the dissociation chamber 22 in FIG. 2. Thus, the dissociation device illustrated in FIG. 3 is in the form of a pipe 30 of predetermined length according to the required halocarbon volume designed for dissociation. It includes an inlet 32 at one end for receiving the halocarbon-containing air, a plurality of radiating sources 34, e.g., lasers or ultraviolet lamps, spaced along its length for irradiating the air passing therethrough, and an outlet 36 for discharging the dissociation products. The number of radiation sources 34 would depend on the quantity of halocarbon to be dissociated in the particular application.

Figure 4:
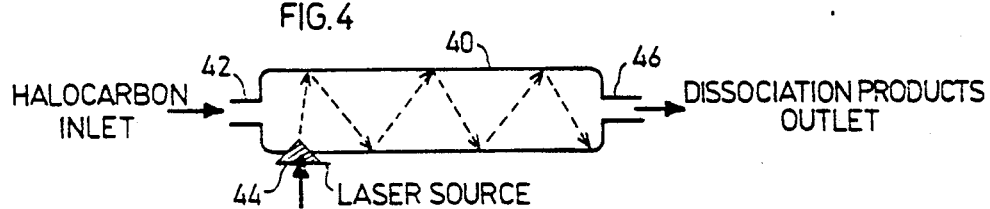

FIG. 4 illustrates another form of device which can be used for the dissociation chamber 22 in FIG. 2. The device illustrated in FIG. 4 is in the form of a conduit or container 40 having an inlet 42 at one end for receiving the halocarbon-containing air, a large radiation source 44 (e.g., laser or ultraviolet lamp) located adjacent the inlet for irradiating the air as it flows through the conduit, and an outlet 46 at its opposite end for discharging the dissociation products. The inner face of conduit 40 is preferably reflecting so as to reflect the laser (or other radiation source) beam along the length of the conduit.

Figure 5:
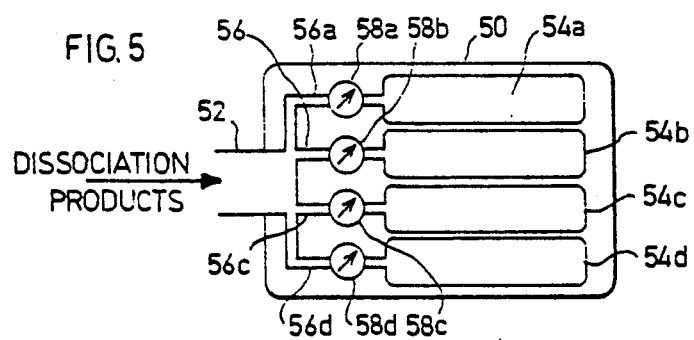
FIG. 5 schematically illustrates one form of reaction chamber which may be used in the apparatus illustrated in FIG. 2.

The reaction chamber 26, in the apparatus of FIG. 2, receiving the disssociation products from the dissociation chamber 22, preferably comprises one or more neutralizing materials capable of capturing the halogen atoms formed in the dissociation chamber into stable beds, or of transforming them into halide salts by reaction with agents, such as ammonia, charcoal, metal catalysts, or basic materials. FIG. 5 illustrates one form of reaction chamber which may be used.

The reaction chamber illustrated in FIG. 5, and therein designated 50, includes an inlet 52 at one end receiving the dissociation products from the dissociation chamber 22, and a plurality of disposable capsules $54a$–$54d$. Each capsule may be filled with a basic material, such as soda lime (NaOH/CaO) in the form of pellets, or in the form of a woven wire grid. Each capsule $54a$–$54d$ is connected to the inlet 52 via a conduit $56a$–$56d$ which includes a valve $58a$–$58d$. The valves are sequentially controlled so that the dissociation products are first fed to the first capsule $54a$ via its conduit $56a$ and valve $58a$, until that capsule is spent, following which the dissociation products are then directed to the other capsules $54b$–$54d$ in sequence. The spending of each capsule may be indicated visually by selecting materials to produce a colour change, or may be indicated electrically by a sensor which outputs an electrical signal when the reacting agents are spent.

The reaction chamber 26 may include only a single capsule rather than a plurality. Also, the capsule or capsules may contain ammonia and a catalyst bed of charcoal.

The halocarbon detector (10) in FIG. 2 may be of a type which samples the air by drawing a small quantity into the detector housing and analysing the Halon content thereof. Alternatively, detector 10 may be of the remote sensing type that analyses the air content for Halon in the entire closure 4. The analysis can be a catalytic process where the detection depends on the Halon specifc catalytic properties, or a spectroscopic process where the detection depends on the Halon absorption/emission of a specific wavelength of light passing through it.

One example of a detector that can be used is one of the GIG gas measurement sensors No. 25–29, designed for detection of Halons and Freons at TLV (Threshold Limit Values) concentrations. The detector may be either portable or stationary, and may use sensor type G92/0136 "WL" or G92/0165 "TOX", manufactured by GIG-Gesellschaft fur Gerateban, Germany.

Another type of halocarbon detector which may be used is the Perco Model 113 halocarbon analyser designed for detection of halocarbons in air at concentrations between 0-10%, manufactured by Peerless Electronics Research Corp., U.S.A.

Detectors of the remote sensing type, although employed for various gas detection applications, are not known commercially for the detection of halocarbons. However, these commercial detectors may also be used for the detection of the halocarbon concentration by using a specific irradiating source (monochromatic light at the halocarbon absorption band) at one location in the enclosure, and measuring the output at a spectral detector set at another location, while the air containing the halocarbon is in between. For this application, a $CO_2$ laser can be employed as the light source while the detector output can be measured by a regular diode or solid state detector.

The radiation source (24, FIG. 2) may be a laser, an infrared or ultraviolet (excimer) light source, a flash lamp with high enery output, and the like. If an infrared laser is used, preferably it is a $CO_2$ laser with wavelengths of 9.4-10.4 micrometers. If an ultraviolet (or excimer) laser is used, preferably it is of the NeYAG type, with wavelengths of 268-300 nm, or of the ArF type, with wavelengths of 140-190 nm. The exact wavelength of irradiation should be determined according to the specific material to be irradiated (absorption lines) and its quantity.

The radiation source 24 may also be an ultraviolet lamp such as one of the commercially-available phospher-coated mercury lamps, xenon lamps, etc.

The intensity of the radiation source, and the time period of application, will depend on the quantity of the halocarbons that must be dissociated. For example, one mole of Halon $CF_3Br$ contains 148.9 grams. A molecular bond, such as C-F, requires 108 Kcal-mole for dissociation, while a C-Br bond requires approximately 80 Kcal/mole. Since one watt is equivalent to 1.433 Kcal per minute, the dissociation of 1 mole of halocarbon would require approximately 55-75 watts, depending on which bond is to be dissociated, at 100% efficiently of irradiation for a time period of one minute. For practical purposes, an efficiency of 20-30% the required energy would be about 220-300 watts.

The illustrated apparatus can be attached to the system supplying or using halocarbons, so as to ensure that once the halocarbon is released into the surroundng areas (whether following a malfunction or following a controlled release such as an extinguishing process), it is drawn into the dissociation chamber, at which time it is irradiated by a high energy laser, ultraviolet light, or other high energy source.

While the invention has been described with respect to several preferred embodiments, it will be appreciated that these are set forth merely for purposes of example, and that many other variations, modification and applications of the invention may be made.

What is claimed is:

1. A method of providing ecological protection with respect to equipment using halogenated hydrocarbons, comprising:
    enclosing the equipment within an enclosure having a first outlet for normally discharging air from the enclosure to the atmosphere;
    detecting the presence of a halogenated hydrocarbon within said enclosure, and upon detecting its presence above a predetermined concentration, discharging the air from the disclosure through a second outlet;
    applying a source of radiation to the halogenated hydrocarbon in the air discharged from said enclosure through said second outlet for effecting selective dissociation of the halogenated hydrocarbon to separate the halogen atoms therefrom; and immediately neutralizing said separated halogen atoms by converting them to a halide salt.

2. The method according to claim 1, wherein the source of radiation is energized automatically in response to the detection of the presence of the halogenated hydrocarbon above a predetermined threshold concentration.

3. The method according to claim 1, wherein the air within the enclosure is pumped to a separator where the halogenated hydrocarbon is separated, the separated halogenated hydrocarbon is irradiated by said energized source of radiation, and the air remaining after said separation is discharged to the atmosphere.

4. The method according to claim 3, wherein the pumping of the air from the enclosure to said separator, as well as the energization said source of radiation, is effected automatically in response to the detection of the halogenated hydrocarbon above said predetermined threshold concentration within said enclosure.

5. The method according to claim 4, wherein said separation is effected by a cyclone centrifuge.

6. The method according to claim 4, wherein said separation is effected by a molecular sieve.

7. The method according to claim 4, wherein said separation is effected by a gas chromatograph.

8. The method according to claim 1, wherein the halogen atoms separated from said hydrocarbon are converted to a halide salt in a reaction chamber.

9. The method according to claim 8, wherein said reaction chamber includes an alkali reactant.

10. The method according to claim 8, wherein said reaction chamber includes ammonia.

11. The method according to claim 8, wherein said reaction chamber includes a charcoal absorbant.

12. The method according to claim 8, wherein said reaction chamber includes a metal catalyst bed.

13. The method according to claim 1, wherein said source of radiation is a laser.

14. The method according to claim 13, wherein said source of radiation is an ultraviolet lamp.

15. Apparatus for providing ecological protection with respect to equipment using a halogenated hydrocarbon, comprising:
    an enclosure enclosing the equipment and having a first outlet for normally discharging air from the enclosure to the atmosphere, said enclosure including a second outlet;
    a detector for detecting the presence within said enclosure of a halogenated hydrocarbon above a predetermined concentration;
    a dissociation chamber;
    means for discharging the air through said second outlet to said dissociation chamber when said predetermined concentration of the halogenated hydrocarbon is detected; and
    a source of radiation in said dissociation chamber for effecting selective dissociation of the halogenated hydrocarbon to separate the halogen atoms therefrom;
    and means for converting said separated halide atoms to a halide salt.

16. The apparatus according to claim 15, further including means for energizing said source of radiation automatically in response to the detection of the presence of the halogenated hydrocarbon above said predetermined threshold concentration.

17. The apparatus according to claim 15, further including
a separator for separating the halogenated hydrocarbon from the air;
a pump for pumping the air from the enclosure to said separator; and
means for directing the separated halogenated hydrocarbon to said dissociation chamber, and for discharging the air from said separator to the atmosphere after the halogenated hydrocarbon has been separated therefrom.

18. The apparatus according to claim 17, wherein the apparatus further includes means controlled by said detector for pumping the air from the enclosure to said separator, and for energizing said source of radiation, automatically in response to the detection of the halogenated hydrocarbon within said enclosure above said predetermined threshold concentration.

19. The apparatus according to claim 17, further including a reaction chamber for converting the halogen atoms separated from the hydrocarbon to a halide salt.

20. The apparatus according to claim 15, wherein said source of radiation is a laser.

* * * * *